(12) United States Patent
Nakamura et al.

(10) Patent No.: US 12,128,317 B2
(45) Date of Patent: Oct. 29, 2024

(54) INFORMATION PROCESSING PROGRAM, INFORMATION PROCESSING DEVICE, AND INFORMATION PROCESSING SYSTEM FOR DECK MANAGEMENT OF A COMPUTER GAME

(71) Applicant: CYGAMES, INC., Tokyo (JP)

(72) Inventors: Takatoshi Nakamura, Tokyo (JP); Takashi Fujita, Tokyo (JP); Takafumi Goto, Tokyo (JP)

(73) Assignee: CYGAMES, INC., Tokyo (JP)

( * ) Notice: Subject to any disclaimer, the term of this patent is extended or adjusted under 35 U.S.C. 154(b) by 228 days.

(21) Appl. No.: 17/456,100

(22) Filed: Nov. 22, 2021

(65) Prior Publication Data
US 2022/0080322 A1    Mar. 17, 2022

Related U.S. Application Data

(63) Continuation of application No. PCT/JP2020/018504, filed on May 7, 2020.

(30) Foreign Application Priority Data

May 24, 2019  (JP) ................................. 2019-098017

(51) Int. Cl.
*A63F 9/24*       (2006.01)
*A63F 13/335*   (2014.01)
*A63F 13/79*    (2014.01)

(52) U.S. Cl.
CPC ............ *A63F 13/79* (2014.09); *A63F 13/335* (2014.09)

(58) Field of Classification Search
None
See application file for complete search history.

(56) References Cited

U.S. PATENT DOCUMENTS

| 2011/0275442 A1* | 11/2011 | Hawkins, III | A63F 13/30 463/42 |
| 2014/0327210 A1 | 11/2014 | Gerard et al. | |
| 2019/0262715 A1 | 8/2019 | Ohashi | |

FOREIGN PATENT DOCUMENTS

| JP | 4975880 B1 | 7/2012 |
| JP | 5199494 B1 | 5/2013 |

(Continued)

OTHER PUBLICATIONS

Hearthstone Japanese Wiki Hearthstone Maniac, Denfami Wiki, "creation method of a card",Internet: <URL: https://wiki.denfaminicogamer.jp/hearthstone/cards, Feb. 3, 2016, [online], [retrieved on Jul. 25, 2019] (7 pages).

(Continued)

*Primary Examiner* — Lawrence S Galka
(74) *Attorney, Agent, or Firm* — Osha Bergman Watanabe & Burton LLP

(57) ABSTRACT

A computer realizes: a management function for managing first management information and second management information as information for managing game media having assigned thereto medium identifiers that are common for each same kind, the first management information indicating the medium identifiers and the number of game media possessed by a player, and the second management information indicating the medium identifiers and usage periods of game media having the usage periods set therefor; a determination function for determining game media available to the player based on the first management information and the second management information; and a set creation function for creating a medium set that includes a plurality of game media and that can include a plurality of game media of the same kind, based on an operation performed by (Continued)

the player to select from the game media available to the player, determined by the determination function.

8 Claims, 8 Drawing Sheets

(56) References Cited

FOREIGN PATENT DOCUMENTS

| | | | |
|---|---|---|---|
| JP | 2014-117354 A | 6/2014 |
| JP | 2014-188166 A | 10/2014 |
| JP | 2018-000995 A | 1/2018 |
| JP | 6469273 B1 | 2/2019 |

OTHER PUBLICATIONS

International Search Report issued in PCT/JP2020/018504 on Jul. 28, 2020 (3 pages).
Written Opinion of the International Searching Authority issued PCT/JP2020/018504 on Jul. 28, 2020 (4 pages).
Office Action issued in the counterpart Japanese Patent Application No. 2019-098017, mailed on Aug. 13, 2019 (13 pages).

\* cited by examiner

INFORMATION PROCESSING PROGRAM, INFORMATION PROCESSING DEVICE, AND INFORMATION PROCESSING SYSTEM FOR DECK MANAGEMENT OF A COMPUTER GAME

TECHNICAL FIELD

The present invention relates to information processing programs, information processing devices, and information processing systems.

BACKGROUND ART

As computer games, games in which various game media are used are known. For example, a game in which electronic cards are used as game media and a battle is played by means of the electronic cards is known.

Patent Literature 1 discloses an example of technology relating to such computer games in which game media are utilized. According to the technology disclosed in Patent Literature 1, "trial cards", which are cards having usage periods set therefor, are created. Furthermore, the trial cards are temporarily made available within the usage periods even for players who do not possess those trial cards. This makes it possible to inform the players of the presence of a variety of cards, which serves to further improve game intricacies.

CITATION LIST

Patent Literature

[PTL 1]
Japanese Unexamined Patent Application, Publication No. 2018-995

DISCLOSURE OF THE INVENTION

Problems to be Solved by the Invention

With the above-described ordinary technology disclosed in Patent Literature 1, etc., laborious processing by means of a computer is required in order to manage game media having various properties on the computer, such as game media that are possessed by a player and game media that are not possessed by the player but that are available within the usage periods thereof. In order to manage such game media having various properties, laborious processing by means of the computer is required, such as managing game media on the basis of unique serial numbers individually assigned to all the game media in addition to medium identifiers for distinguishing the individual kinds of game media.

The present invention has been made in view of the situation described above, and it is an object thereof to more simply manage game media having various properties on a computer.

Means for Solving the Problems

In order to achieve the object mentioned above, an information processing program according to an aspect of the present invention causes a computer to realize:

a management function for managing first management information and second management information as information for managing game media having assigned thereto medium identifiers that are common for each medium of the same kind, the first management information indicating the medium identifiers and the number of game media possessed by a player, and the second management information indicating the medium identifiers and usage periods of game media having the usage periods set therefor;

a determination function for determining game media available to the player on the basis of the first management information and the second management information; and a set creation function for creating a medium set that includes a plurality of game media and that can include a plurality of game media of the same kind, on the basis of an operation performed by the player to select from the game media available to the player, determined by the determination function.

Effects of the Invention

The present invention makes it possible to more simply manage game media having various properties on a computer.

PREFERRED MODE FOR CARRYING OUT THE INVENTION

Figure 1:
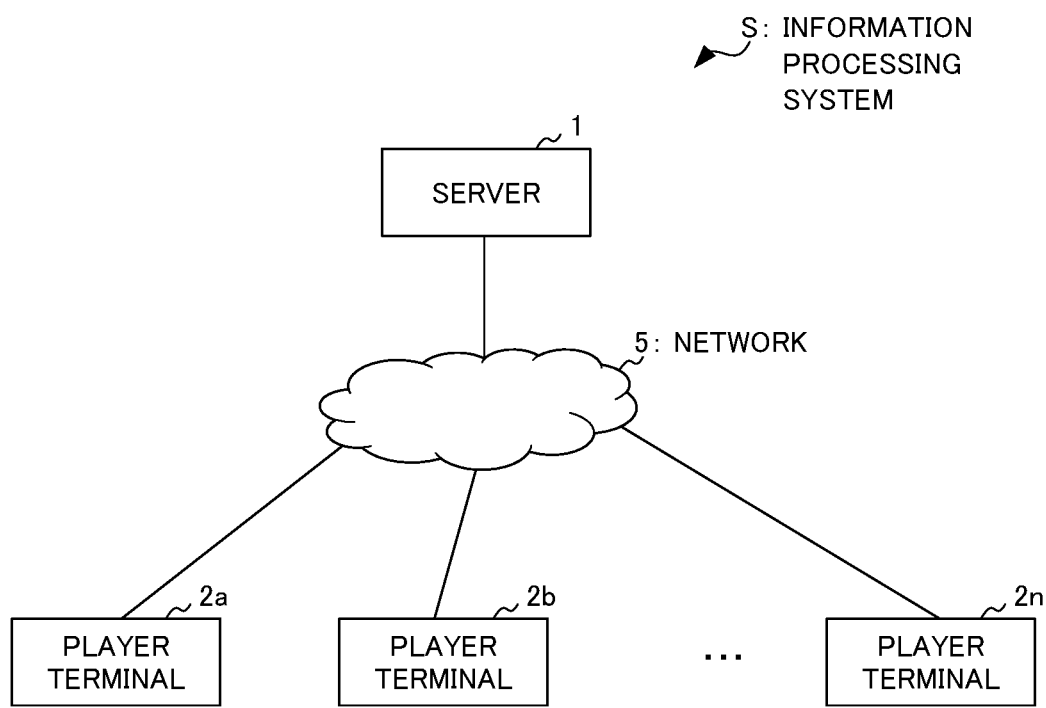
FIG. 1 is a block diagram showing the overall configuration of an information processing system according to an embodiment of the present invention.

An embodiment of the present invention will be described below with reference to the drawings.
[Overall Configuration of the System]
The overall configuration of this embodiment will be described with reference to FIG. 1. FIG. 1 is a block diagram showing the overall configuration of an information processing system S according to this embodiment.

As shown in FIG. 1, the information processing system S is configured to include a server 1, n (n is an arbitrary integer greater than or equal to one) player terminals 2, and a network 5.

The information processing system S is what is called a client-server system. The information processing system S is realized by mutually carrying out communication between the n player terminals 2 acting as clients and the server 1 via the network 5.

The server 1 is realized, for example, by a server device. Furthermore, the player terminals 2 are realized, for example, by smartphones, installed or portable game machines, or personal computers. Furthermore, the network 5 is realized, for example, by a network such as a local area network (LAN), the Internet, or a mobile phone network, or a network formed by combining these types of networks.

In the drawings, a player terminal 2a, a player terminal 2b, and a player terminal 2n are shown as the n player terminals 2. In the following description, however, these n player terminals 2 will be simply referred to as the "player terminals 2", with the reference signs partially omitted, in the case where no distinction is made thereamong.

Overview of this Embodiment

Next, an overview of processing by the information processing system S according to this embodiment, shown in FIG. 1, will be described.

The information processing system S is directed to more simply managing game media having various properties on a computer.

For this purpose, in the information processing system S, a medium management process is executed through cooperation between the server 1 and the player terminals 2. Here, the medium management process refers to a series of processing steps through which game media available to players and having various properties are simply managed on a computer.

In the medium management process, as information for managing game media (e.g., cards) having assigned thereto a common medium identifier (e.g., a card ID) for each medium of the same kind, the information processing system S manages first management information indicating the medium identifier and the number of game media that a player possesses, as well as second management information indicating the medium identifiers and available periods of game media having available periods set therefor. Furthermore, the information processing system S determines game media available to the player on the basis of the first management information and the second management information.

Then, on the basis of an operation performed by the player to select game media from the game media determined as being available to the player, the information processing system S creates a medium set (e.g., a deck) that includes a plurality of game media and that can include a plurality of game media of the same kind (e.g., having the same graphics and the same ability).

With the medium management process described above, it is possible to individually manage types of cards having different properties, namely, "cards possessed by a player", which are constantly available to the player, and "cards having available periods set therefor", which are not possessed by the player but are available only within the available periods, on the basis of card IDs that are common for each kind irrespective of properties.

That is, with the information processing system S, it is possible to more simply manage game media having various properties on a computer, without having to execute the laborious processing necessary in common technologies, such as managing game media on the basis of unique serial numbers individually assigned thereto. Furthermore, with the information processing system S, it is possible to proceed with a game while performing such simple management and creating a deck including cards having different properties as selected by a player.

In the above description of the medium management process, cards are considered as an example of game media, card IDs are considered as an example of medium identifiers, a deck is considered as an example of a medium set, and game media having the same graphics and the same ability are considered as an example of game media of the same kind. However, these are merely examples, and the subjects of the medium management process are not limited thereto.

For example, in the medium management process, characters or items may be considered as game media instead of cards, the IDs of these game media may be considered as medium identifiers, and a team or group constituted of these game media may be considered as a medium set. Furthermore, in the medium management process, game media having different graphics and the same ability or game media having very similar abilities may be considered as game media of the same kind.

[Hardware Configurations]

Figure 2:
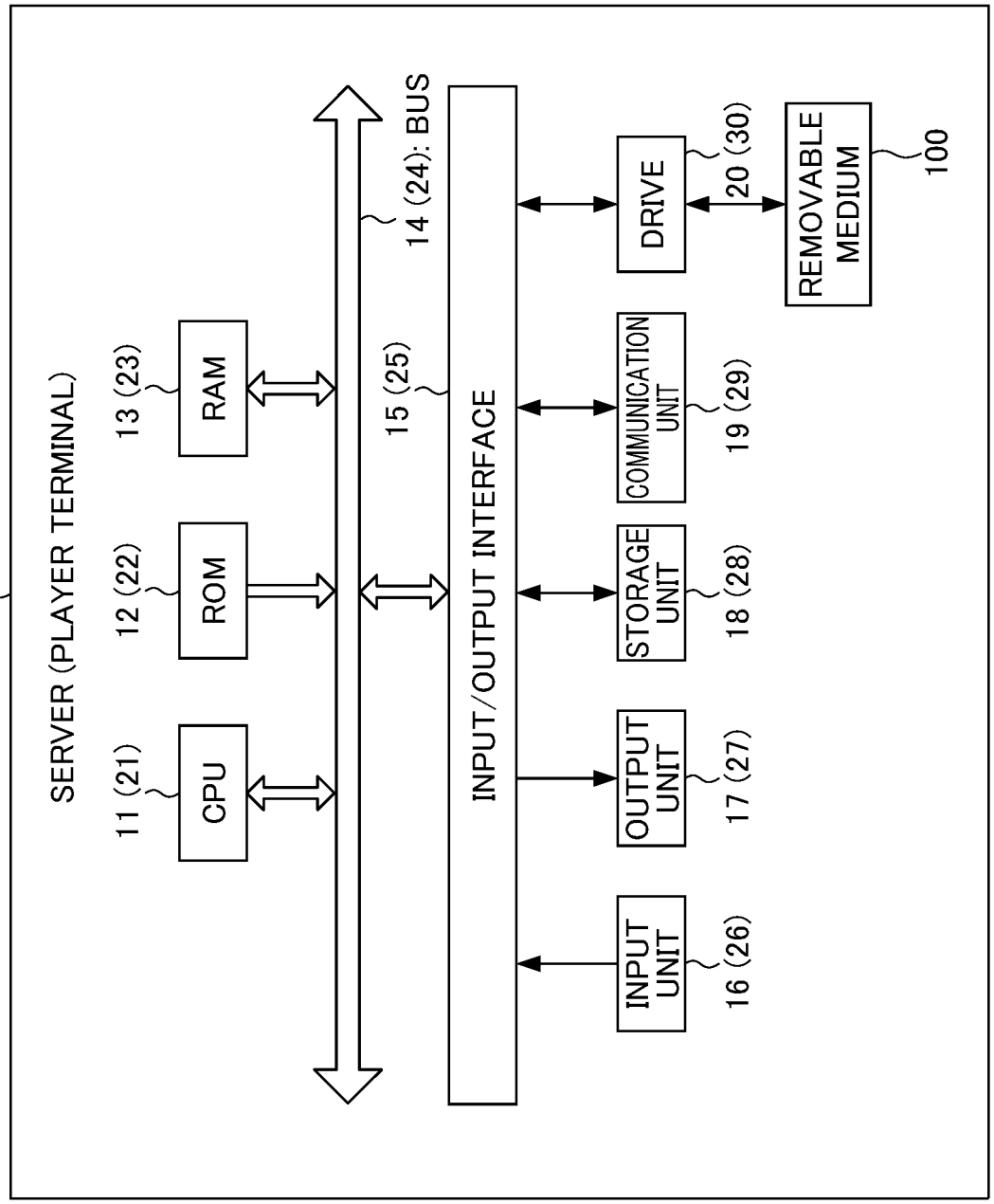
FIG. 2 is a block diagram showing the hardware configuration of a server and the hardware configuration of a player terminal, included in the information processing system according to the embodiment of the present invention.

Next, the hardware configurations in this embodiment will be described with reference to FIG. 2. FIG. 2 is a block diagram showing the hardware configuration of the server 1 and the hardware configuration of the player terminal 2, included in the information processing system S according to the embodiment of the present invention. In the figure, reference signs corresponding to the hardware of the server 1 are shown without parentheses added thereto, and reference signs corresponding to the hardware of the player terminal 2 are shown with added parentheses.

First, the hardware configuration of the server 1 will be described. As shown in FIG. 2, the server 1 includes a central processing unit (CPU) 11, a read only memory (ROM) 12, a random access memory (RAM) 13, a bus 14, an input/output interface 15, an input unit 16, an output unit 17, a storage unit 18, a communication unit 19, and a drive 20.

The CPU 11 executes various kinds of processing according to programs recorded in the ROM 12 or programs loaded from the storage unit 18 into the RAM 13.

The RAM 13 also stores, as appropriate, data, etc. needed for the execution of various kinds of processing by the CPU 11.

The CPU 11, the ROM 12, and the RAM 13 are connected to each other via the bus 14. The input/output interface 15 is also connected to the bus 14. The input unit 16, the output unit 17, the storage unit 18, the communication unit 19, and the drive 20 are connected to the input/output interface 15.

The input unit 16 is formed of various kinds of buttons, a touchscreen, a microphone, or the like, and accepts the input of various kinds of information in accordance with instruction operations performed by the administrator or the like of the server 1. Alternatively, the input unit 16 may be realized by an input device, such as a keyboard or a mouse, that is independent of a main unit accommodating the other units of the server 1.

The output unit 17 outputs image data and music data to a display, a speaker, etc. The image data and music data output from the output unit 17 are output from the display, the speaker, etc. in forms recognizable by the player, as an image and music.

The storage unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the individual player terminals 2 via the network 5.

The drive 20 is provided as needed and as appropriate. A removable medium 100 formed of a magnetic disk, an optical disk, a magneto-optical disk, a semiconductor memory, or the like is loaded, as appropriate, in the drive 20. The removable medium 100 stores a program for executing a game, as well as various kinds of data, such as image data. The program and the various kinds of data, such as image data, read by the drive 20 from the removable medium 100, are installed in the storage unit 18, as needed.

Next, the hardware configuration of the player terminal 2 will be described. As shown in FIG. 2, the player terminal 2 includes a CPU 21, a ROM 22, a RAM 23, a bus 24, an input/output interface 25, an input unit 26, an output unit 27, a storage unit 28, a communication unit 29, and a drive 30. These units individually have functions equivalent to those of the units having the same names and different reference signs in the server 1 described above. Thus, repeated descriptions will be omitted.

In the case where the player terminal 2 is configured as a portable device, the individual hardware units of the player terminal 2, as well as a display, a speaker, and a battery for supplying electric power to these devices, may be realized in the form of an integrated device.

[Functional Configurations]

Figure 3:
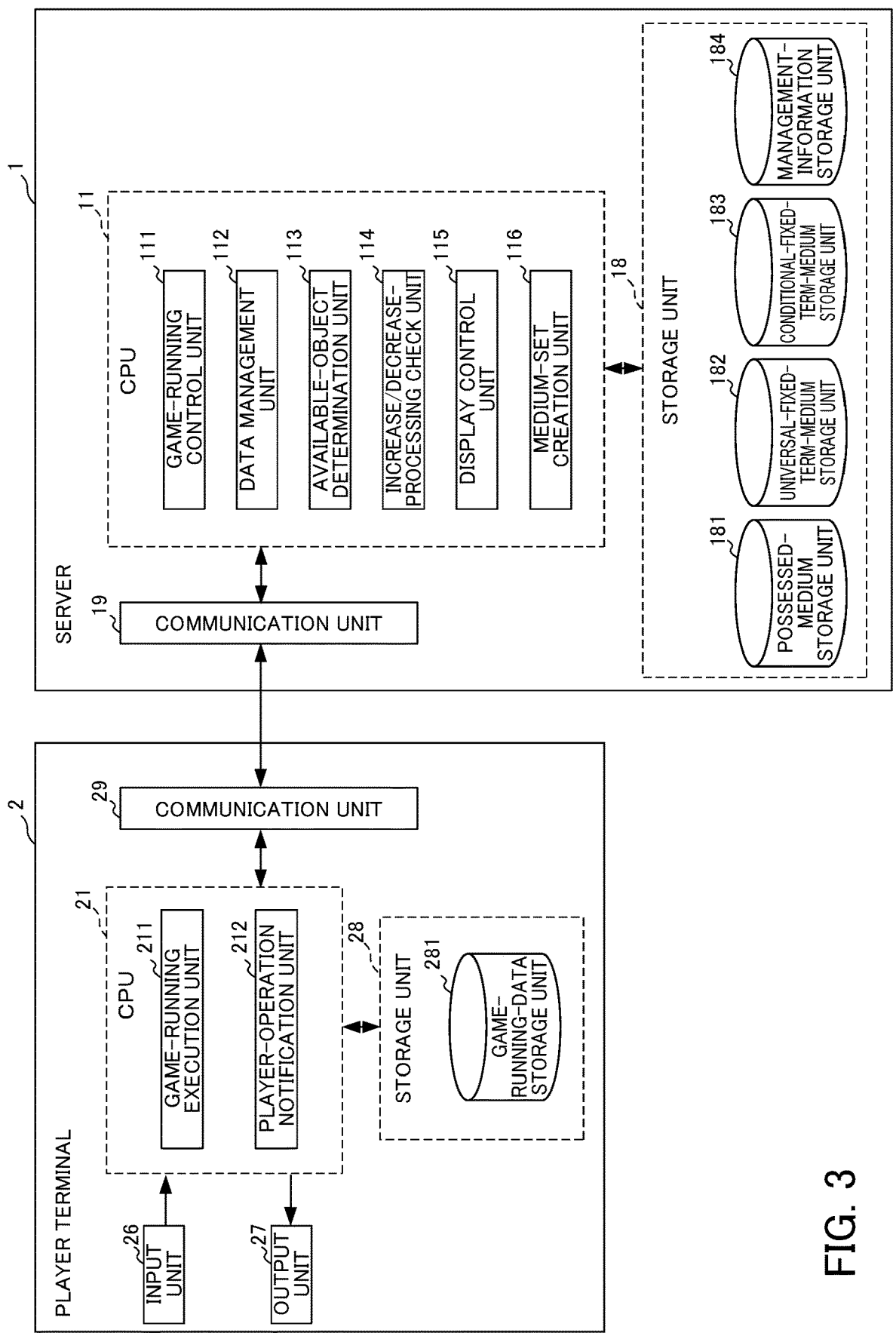
FIG. 3 is a functional block diagram showing functional configurations for executing a medium management process in the functional configurations of the server and the player terminal in FIG. 2.

Next, the functional configuration of the server 1 and the functional configuration of the player terminal 2, shown in FIGS. 1 and 2, will be described with reference to FIG. 3. FIG. 3 is a functional block diagram showing, in the functional configurations of the server 1 and the player terminal 2, functional configurations for executing the medium management process described above.

First, the functional configuration of the player terminal 2 will be described.

In the case where the medium management process is executed, the CPU 21 functions as a game-running execution unit 211 and a player-operation notification unit 212, as shown in FIG. 3. Furthermore, a game-running-data storage unit 281 is set in an area of the storage unit 28. These individual functional blocks send information to and receive information from each other as needed.

The game-running execution unit 211 executes processing for running a game. The game-running execution unit 211 runs the game on the basis of game software included in the game-running-data storage unit 281, which will be described later, the content of player operations relating to the game, input via the input unit 26 and included in notifications from player-operation notification unit 212, which will be described later, and the results of processing by the individual functional blocks included in the server 1, included in notifications from a game-running control unit 111, which will be described later.

Furthermore, as the game is run, the game-running execution unit 211 executes control processing for generating game images from image data included in the game-running-data storage unit 281, which will be described later, and displaying the generated images on the display connected to the output unit 27. Similarly, as the game is run, the game-running execution unit 211 executes control processing for generating game music (including sound effects) and audio from music data and audio data included in the game-running-data storage unit 281, which will be described later, and outputting the generated game music and audio from the speaker connected to the output unit 27.

Here, in this embodiment, the server 1 manages prescribed parameters in the game run by the game-running execution unit 211. For example, the server 1 manages a parameter indicating which cards, items, etc. are possessed by the player, a parameter indicating cards included in a deck created by the player, a parameter indicating the past game results, such as wins and losses in the game, and a parameter corresponding to the amount of in-game currency possessed in the game.

Thus, in the case where processing involving changes in these prescribed parameters has occurred in the game, the game-running execution unit 211 carries out communication with the server 1 to update the parameters managed by the server 1. Then, the game-running execution unit 211 receives the updated parameters from the server 1 and continues to run the game in accordance with the updated parameters.

For example, purchasing a card pack, generating and decomposing a card, which will be described later, creating a deck, winning or losing in a battle game, and acquiring an item constitute processing involving changes in the prescribed parameters. Thus, in the case where processing involving changes in these prescribed parameters has occurred, the game-running execution unit 211 carries out communication with the server 1 to update the parameters.

This communication with the server 1 by the game-running execution unit 211 is carried out by using the communication unit 29. As described earlier with reference to FIG. 1, the network 5 for realizing communication is present between the player terminal 2 and the server 1; however, the network 5 is not shown in FIG. 3.

It is assumed that, as the game in this embodiment, the game-running execution unit 211 runs a digital card game in which a deck is created by using cards available to the player and in which a battle is performed by using the created deck. The opponent of the battle in this game may be a non-player character (NPC) or other players using the other player terminals 2. That is, the game may be what is called a multi-play game, in which battles are played among a plurality of players.

However, the digital card game is merely an example of a game that can be run in this embodiment, and it is possible with this embodiment to run various games utilizing a plurality of game media other than digital card games. That is, the scope of application of this embodiment is not limited to digital card games.

The player-operation notification unit 212 notifies the game-running execution unit 211 of the content of selection by the player. For example, on the basis of a player operation input via the input unit 26, the player-operation notification unit 212 accepts a deck creating operation including an operation for selecting cards to be included in a card deck, a deck using operation (e.g., an operation for starting a battle in which a deck is used) including an operation for selection from a created card deck, an instruction operation of various kinds in the battle, and an instruction operation for card generation or decomposition. Then, the player-operation notification unit 212 notifies the game-running execution unit 211 of the content of the accepted player operation. Upon receiving this notification, the game-running execution unit 211 continues to run the game on the basis of the content of the operation according to the notification.

The game-running-data storage unit 281 stores various kinds of data needed for the game-running execution unit 211 to run the game (a battle-type digital card game here, as described earlier). For example, the various kinds of data for running the game refer to game software, which is a program for executing the game, as well as image data, music data, and audio data for generating game images and sounds. Furthermore, in the case where at least a portion of card graphics, characters, and the background is displayed by using three-dimensional computer graphics in the game, the game-running-data storage unit 281 also stores polygon data, texture data, etc. for realizing display utilizing three-dimensional computer graphics.

Although these various kinds of data for running the game may be stored in only the game-running-data storage unit 281 of the storage unit 28, the data may also be read, as appropriate, from the removable medium 100 by the drive 20.

Alternatively, these various kinds of data may be transmitted, as appropriate, to the player terminal 2 through communication via the communication unit 29 from the server 1 or other devices such as servers not shown. That is, these various kinds of data may be downloaded, as needed and as appropriate, when the game is installed or when the game is updated.

Next, the functional configuration of the server 1 will be described.

In the case where the medium management process is executed, the CPU 11 functions as a game-running control unit 111, a data management unit 112, an available-object determination unit 113, an increase/decrease-processing check unit 114, a display control unit 115, and a medium-set generation unit 116, as shown in FIG. 3. Furthermore, a possessed-medium storage unit 181, a universal-fixed-term-medium storage unit 182, a conditional-fixed-term-medium storage unit 183, and a management-information storage unit 184 are set in an area of the storage unit 18. These individual functional blocks send information to and receive information from each other as needed.

The game-running control unit 111 executes control relating to the game (a battle-type digital card game here, as described earlier) run at the player terminal 2 by carrying out communication with the game-running execution unit 211 of the player terminal 2 and cooperating with the individual functional blocks of the server 1.

For example, the game-running control unit 111 carries out communication with the game-running execution unit 211 in the case where processing involving changes in prescribed parameters in the game has occurred. Then, by cooperating with the individual functional blocks of the server 1, the game-running control unit 111 changes the prescribed parameters and notifies the game-running execution unit 211 of the changed prescribed parameters as well as information concerning how the game is subsequently run.

Upon receiving this notification, the game-running execution unit 211 continues to run the game on the basis of the notification from the game-running control unit 111. Specifically, the game-running execution unit 211 runs the game on the basis of the prescribed parameters included in the notification, while generating images and sounds corresponding to how the game is run and outputting the generated images and sounds from the output unit 27.

As described above, in this embodiment, it is possible to run the game through cooperation between the player terminal 2 and the server 1. Furthermore, in this embodiment, since at least a part of processing relating to the game is executed at the server, as described above, it is possible to reduce processing at the player terminal 2. Furthermore, in this embodiment, it is possible to prevent tampering of the content of processing relating to the game and of parameters at the player terminal 2.

The data management unit 112 manages various kinds of data relating to the game. For example, the various kinds of data relating to the game refer to data such as the prescribed parameters in the game, described earlier in the description of the game-running execution unit 211. The data such as the prescribed parameters, managed by the data management unit 112, are stored in the storage unit 18. Furthermore, the stored data are updated by the data management unit 112, as appropriate, as the game is run. Note that a plurality of player terminals 2 are connected to the server 1, as described earlier with reference to FIG. 1. Thus, data such as the prescribed parameters are stored individually for each player terminal 2 or for each player on the basis of identification information of that player terminal 2, identification information of that player, or the like. Note, however, that data such as some prescribed parameters are managed as data shared among players.

In the figure, as storage units relating to the medium management process in particular, the figure shows the possessed-medium storage unit 181, the universal-fixed-term-medium storage unit 182, and the conditional-fixed-term-medium storage unit 183 as storage units that store data for managing media. Furthermore, the figure shows the management-information storage unit 184 as a storage unit that stores data such as other prescribed parameters other than the data stored in the possessed-medium storage unit 181, the universal-fixed-term-medium storage unit 182, and the conditional-fixed-term-medium storage unit 183. Next, the data stored in these individual storage units will be described in detail.

The possessed-medium storage unit 181 store data for managing "possessed cards". A possessed card is a card that is possessed by the player, as the name suggests. In the medium management process, possessed cards are handled as cards that are constantly available to the player. A possessed card comes into a state possessed by the player, for example, on the basis of the purchase of a card pack, card generation, or a success in a prescribed in-game mission by the player. Furthermore, a possessed card comes into a state not possessed by the player, for example, on the basis of card decomposition by the player.

Specifically, as the data for managing possessed cards, the possessed-medium storage unit 181 stores a "player ID" for identifying the player who possesses the possessed cards, "card IDs" for identifying the kinds of the possessed cards, and a "number" indicating the number of the cards possessed by the player, in association with each other.

The universal-fixed-term-medium storage unit 182 and the conditional-fixed-term-medium storage unit 183 store data for managing "fixed-term cards". A fixed-term card is a card that is not possessed by the player but that is available only within the usage period thereof. Here, in this embodiment, as fixed-term cards, there are types of fixed-term cards having different properties, namely, "universal fixed-term cards" and "conditional fixed-term cards". That is, in this embodiment, there are cards having three types of properties, namely, possessed cards, universal fixed-term cards, and conditional fixed-term cards.

In the medium management process, universal fixed-term cards are handled as cards that are available to all players only within the usage periods thereof. The usage periods of universal fixed-term cards are set, as appropriate, by the game-service business entity that manages the server 1.

Specifically, as the data for managing universal fixed-term cards, the universal-fixed-term-medium storage unit 182 stores "period information" indicating the start times and end times of the usage periods of the universal fixed-term cards, "card IDs" for identifying the kinds of the universal fixed-term cards, and a "number" indicating the number of the universal fixed-term cards available to the player, in association with each other. Note, however, that there is no need to store the number in association in the case where the number of universal fixed-term cards available to the player is set to be a prescribed number (e.g., one).

Furthermore, in the medium management process, conditional fixed-term cards are handled as cards that are available only within the usage periods thereof only for some players satisfying prescribed conditions. The usage periods of conditional fixed-term cards are set, as appropriate, by the game-service business entity that manages the server 1. Furthermore, the prescribed conditions are also set, as appropriate, by the game-service business entity. For example, a prescribed condition is clearing a prescribed in-game mission. In the case where the player has satisfied a prescribed condition, data for managing a conditional fixed-term card for that player is added to the conditional-fixed-term-medium storage unit 183.

Specifically, as the data for managing conditional fixed-term cards, the conditional-fixed-term-medium storage unit 183 stores "period information" indicating the start times and end times of the usage periods of the conditional fixed-term cards, "card IDs" for identifying the kinds of the conditional fixed-term cards, and a "number" indicating the number of conditional fixed-term cards available to the player, in association with each other. Note, however, that there is no need to store the number in association in the case where the number of conditional fixed-term cards available to the player is set to be a prescribed number (e.g., one).

As the game is run, the data management unit 112 updates, as appropriate, the data for managing media, stored in the possessed-medium storage unit 181, the universal-fixed-term-medium storage unit 182, the conditional-fixed-term-medium storage unit 183, etc.

As described above, three storage units, namely, in this embodiment, the possessed-medium storage unit 181, the universal-fixed-term-medium storage unit 182, and the conditional-fixed-term-medium storage unit 183, store data individually corresponding to cards having three types of properties. This makes it possible to eliminate the need for storing the properties of individual cards in one-to-one association with individual items of data in the individual storage units (i.e., individual records in databases) and to eliminate the need for management utilizing serial numbers. That is, this embodiment makes it possible to more simply manage game media having various properties on a computer.

Although the storage format in these individual storage units is not particularly limited, for example, for the ease of management by the game-service business entity, a commonly used file format, such as comma-separated values (CSV), may be used for individual storage. In this case, for example, data concerning universal fixed-term cards in the universal-fixed-term-medium storage unit 182 may be stored in such a format that single master files provided for individual usage periods are associated with period information.

Furthermore, in addition to the usage periods, the game-service business entity also arbitrarily sets which kinds of cards are to be set as universal fixed-term cards or conditional fixed-term cards. For example, the game-service business entity sets cards having lower probabilities of card occurrence (what is called high rarity) than other cards in the game as universal fixed-term cards or conditional fixed-term cards. This allows the player to use, as a trial, a high-rarity card that the player himself or herself does not possess, which increases the variety of selection in the game, serving to improve game intricacies. Furthermore, in this case, it is assumed that, for example, the player may purchase a new card pack, wishing to possess by himself or herself the high-rarity card that the player has used as a trial. This makes it possible for the game-service business entity to promote the sales of new card packs, etc.

Furthermore, in this embodiment, without limitation to cards having the three types of properties described above, cards having other properties may be managed. For example, some or all conditional fixed-term cards may be managed as conditional indefinite-term cards, setting indefinite usage periods.

The management-information storage unit 184 stores data such as other prescribed parameters other than the data stored in the possessed-medium storage unit 181, the universal-fixed-term-medium storage unit 182, and the conditional-fixed-term-medium storage unit 183. Specifically, the management-information storage unit 184 stores a parameter indicating which items, etc. are possessed by the player, a parameter indicating cards included in a deck created by the player, a parameter indicating the past game results, such as wins and losses in the game, and a parameter corresponding to the amount of in-game currency possessed in the game.

As the game is run, the data management unit 112 updates, as appropriate, the data such as prescribed parameters stored in the management-information storage unit 184 similarly to the data stored in the possessed-medium storage unit 181, the universal-fixed-term-medium storage unit 182, and the conditional-fixed-term-medium storage unit 183.

The available-object determination unit 113 determines cards that are available to the player in the game on the basis of the data stored in the possessed-medium storage unit 181, the universal-fixed-term-medium storage unit 182, and the conditional-fixed-term-medium storage unit 183 described above.

Specifically, the available-object determination unit 113, by cooperating with the game-running control unit 111, obtains the player ID of the player playing the game at the player terminal 2 at the communication destination.

Then, the available-object determination unit 113 extracts the card IDs of the possessed cards associated with the obtained player ID, as well as the number of the possessed cards, from the possessed-medium storage unit 181.

Furthermore, the available-object determination unit 113 extracts the card IDs of universal fixed-term cards for which the usage periods have not yet expired, as well as the number of the universal fixed-term cards, from the universal-fixed-term-medium storage unit 182. Furthermore, the available-object determination unit 113 extracts the card IDs of conditional fixed-term cards that are associated with the obtained player ID and for which the usage periods have not yet expired, as well as the number of the conditional fixed-term cards, from the conditional-fixed-term-medium storage unit 183. In the case where the numbers of universal fixed-term cards and conditional fixed-term cards are prescribed numbers (e.g., one), there is no need to extract the numbers, and the prescribed numbers are used as the numbers of the individual types of cards.

In this manner, the available-object determination unit 113 extracts cards IDs and the number of cards from the individual storage units. Then, the available-object determination unit 113 determines cards available to the player corresponding to the obtained player ID by aggregating these kinds of extracted information.

Furthermore, there are cases where display is performed so that the player can distinguish whether a card available to each player is a possessed card or a universal fixed-term card/conditional fixed-term card or where processing is executed while making distinction thereamong in the game. In this case, the available-object determination unit 113 performs checking for distinctly determining, among the cards available to the player, how many are possessed cards and how many are universal fixed-term cards/conditional fixed-term cards. It is possible to perform this checking, for example, by comparing the cards available after the aggregation with the card IDs and the number of cards extracted from the possessed-medium storage unit 181 and the card IDs and the numbers of cards extracted from the universal-fixed-term-medium storage unit 182 and the conditional-fixed-term-medium storage unit 183 before the aggregation.

The available-object determination unit 113 notifies the individual functional blocks of the server 1, as needed, of information concerning the cards available to the player, as well as information distinctly indicating how many are possessed cards and how many are universal fixed-term cards and conditional fixed-term cards.

The increase/decrease-processing check unit 114 performs checking as to whether or not it is allowed to execute special processing involving an increase or decrease in the number of cards. In this embodiment, separately from ordinary processing involving an increase or decrease in the number of cards, such as purchasing a card pack, three kinds of processing, namely, "card generation", "card decomposition", and "card premiumization", are provided as special processing involving an increase or decrease in the number of cards.

Card generation is processing for generating a card desired by the player and making it a new possessed card at the price of consuming items for generating a card (hereinafter referred to as "material items"). That is, card generation is processing involving an increase in the number of cards. In this case, for example, the amount of material items to be consumed is set so as to vary depending on the rarity of the card. For example, the amount of material items to be consumed is set so as to be greater as the rarity of the card becomes higher. The player can increase material items on the basis of card decomposition, which will be described later, a success in a prescribed in-game mission, etc.

Regarding this point, in this embodiment, as described earlier, a deck can include three cards of the same kind at most. That is, there is no need to newly generate a card of the same kind and to possess four or more cards of the same kind. Thus, the increase/decrease-processing check unit 114 determines that card generation may be executed in the case where an amount of material items greater than or equal to the amount of consumption necessary for the player to generate a desired card is present and three or more cards of the same kind as the card desired by the player are not included (i.e., not more than two such cards are included) in the available cards determined by the available-object determination unit 113.

Card decomposition is processing for increasing material items at the price of decomposing a possessed card and making it no longer possessed. That is, card decomposition is processing involving a decrease in the number of cards. In this case, for example, the amount of increase in material items is set so as to vary depending on the rarity of the card. For example, the amount of increase in material items is set so as to be greater as the rarity of the card becomes higher.

In this embodiment, only possessed cards can be subjected to card decomposition, and universal fixed-term cards and conditional fixed-term cards cannot be subjected to card decomposition. This is because universal fixed-term cards and conditional fixed-term cards are directed to improving game intricacies by letting the player try using cards that the player does not possess, and this purpose is not served if these cards were decomposed into material items. Thus, the increase/decrease-processing check unit 114 determines that card decomposition may be executed when possessed cards are present. Here, the increase/decrease-processing check unit 114 may ascertain whether or not possessed cards are present by receiving a notification from the available-object determination unit 113 or by referring to the possessed-medium storage unit 181.

Card premiumization is processing for changing one kind of card into another kind of card. That is, card premiumization is processing involving a decrease in the number of cards of the one kind and an increase in the number of cards of the other kind. Here, for example, a card of the other kind is a card having an ability equivalent to that of a card of the one kind and having different graphics. For example, different graphics refer to displaying graphics with animation so that the player can watch the graphics more enjoyably.

In this embodiment, only possessed cards can be subjected to card premiumization, and universal fixed-term cards and conditional fixed-term cards are not subjected to card premiumization. The reason for this is the same as the reason for card decomposition; that is, premiumization of universal fixed-term cards and conditional fixed-term cards does not serve the purpose of improving game intricacies by letting the player try using cards that the player does not possess. Thus, the increase/decrease-processing check unit 114 determines that card premiumization may be executed when possessed cards are present. Here, the increase/decrease-processing check unit 114 may ascertain whether or not possessed cards are present by receiving a notification from the available-object determination unit 113 or by referring to the possessed-medium storage unit 181.

The increase/decrease-processing check unit 114, by cooperating with the game-running control unit 111, notifies the player terminal 2 of whether or not it is allowed to execute special processing involving an increase or decrease in the number of cards, determined in the manner described above. The game-running execution unit 211 of the player terminal 2 runs the game on the basis of whether or not the execution is allowed according to the notification.

The display control unit 115 executes control for performing switching, in accordance with the game scene, between the manners of display so that the player can distinguish or cannot distinguish whether each card available to the player is a possessed card or a universal fixed-term card/conditional fixed-term card.

Specifically, the display control unit 115 determines a display screen on the basis of which scene is the current scene in the game. That is, the display control unit 115 determines the choice between a display screen with which the player can distinguish whether each card available to the player is a possessed card or a universal fixed-term card/conditional fixed-term card and a display screen with which the player cannot. Then, the display control unit 115, by cooperating with the game-running control unit 111, notifies the player terminal 2 of the determined display screen. The game-running execution unit 211 of the player terminal 2 displays the cards available to the player in the display screen according to the notification. For example, in the case of the distinguishable manner of display, the number of possessed cards and the number of universal fixed-term cards/conditional fixed-term cards are indicated distinctly. Meanwhile, in the case of indistinguishable manner of display, distinction is not made among the numbers of these types of cards.

Specific examples of display screens in this embodiment will be described later with reference to FIGS. 5 to 9.

The medium-set generation unit 116 creates a deck that includes a plurality of cards and that can include a plurality of cards of the same kind on the basis of a deck creating operation including an operation performed by the player to select cards from the cards available to the player, determined by the available-object determination unit 113.

In this embodiment, as an example, a deck is created by using forty cards. Furthermore, the deck can include three cards of the same kind at most. Obviously, the numbers of cards concerning a deck are merely examples, and there is no particular limitation to the examples.

A deck can include any cards that are available to the player, irrespective of whether the cards are possessed cards or universal fixed-term cards/conditional fixed-term cards.

However, in the case where both a possessed card and a universal fixed-term card/conditional fixed-term card of the same kind are present as available cards, the possessed card is included in a deck preferentially than the universal fixed-term card/conditional fixed-term card. This serves to reduce the possibility that the number of cards included in a deck becomes insufficient due to the expiration of the usage periods of universal fixed-term cards or conditional fixed-term cards and the resulting decrease in the number of available cards, which results in the need for the player to recreate a deck.

Under the conditions described above, the medium-set generation unit 116 creates a deck on the basis of a deck creating operation including an operation performed by the player to select cards. Furthermore, the medium-set generation unit 116 stores the created deck in the management-information storage unit 184 together with the card IDs of the cards included in the deck and the player ID of the player who has created the deck. In this case, there is no need to store information indicating the attributes of cards included in the deck in the management-information storage unit 184. That is, after creating a deck, the medium-set generation unit 116 can manage the deck on the basis of the number of cards available to the player, determined by the available-object determination unit 113, without having to distinguish whether each of the cards included in the deck is a possessed card or a universal fixed-term card/conditional fixed-term card.

Furthermore, in the case where the player uses an already created deck in order to play a battle, the medium-set generation unit 116 checks whether or not the number of cards included in the deck has become insufficient due to the expiration of the usage periods of universal fixed-term cards or conditional fixed-term cards and the resulting decrease in the number of available cards.

Specifically, in the case where a deck is used, the medium-set generation unit 116 compares the number of cards included in that deck with the number of cards currently available to the player, determined by the available-object determination unit 113, to check whether or not the number of cards included in the deck is insufficient. In the case where the number of cards is not insufficient, the medium-set generation unit 116, by cooperating with the game-running control unit 111, notifies the player terminal 2 of an indication to the effect that the number of cards is not insufficient and that the deck is usable. The game-running execution unit 211 of the player terminal 2 runs the game by using the deck on the basis of the notification.

Meanwhile, in the case where the number of cards is insufficient, the medium-set generation unit 116, by cooperating with the game-running control unit 111, notifies the player terminal 2 of an indication that the number of cards is insufficient and that the deck is not usable. The game-running execution unit 211 of the player terminal 2 performs the indication according to the notification. This encourages the player to recreate the deck or to use another deck.

Regarding this point, in this embodiment, as described earlier, among cards of the same kinds, a possessed card is included in a deck more preferentially than a universal fixed-term card or a conditional fixed-term card. However, in the case where a number of cards not less than the number of possessed cards are included in a deck, or in the case where there are no possessed cards among available cards, universal fixed-term cards or conditional fixed-term cards are included in a deck. In such cases, when the usage periods expire and the number of available cards decreases, the medium-set generation unit 116 determines that the number of cards included in the deck is insufficient.

Note, however, that in the case where the usage periods expire and the number of available cards decreases after a deck is created but the number of possessed cards increases in the meantime, there are cases where the number of available cards does not become insufficient as a whole. Thus, in such cases, the medium-set generation unit 116 considers that the cards with expired usage periods have been deleted from the deck and that the increased possessed cards have been added, and determines that the number of cards included in the deck is not insufficient.

The medium-set generation unit 116, by cooperating with the game-running control unit 111, notifies the player terminal 2 of whether or not the deck is usable on the basis of whether or not the number of cards included in the deck is insufficient, determined in the manner described above. The game-running execution unit 211 of the player terminal 2 runs the game on the basis of whether or not the deck is usable according to the notification.

[Operation]

Figure 4:
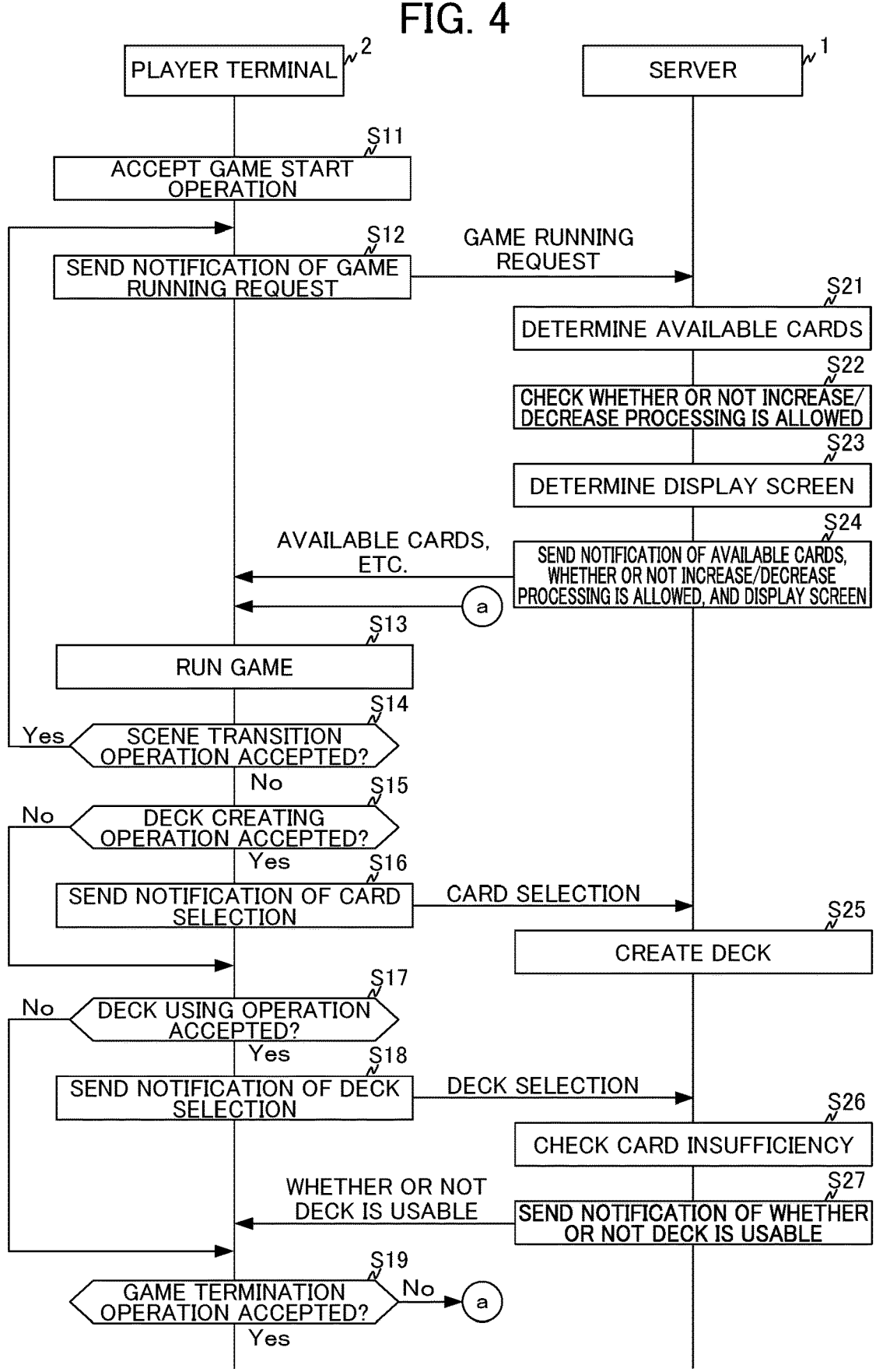
FIG. 4 is a sequence diagram for explaining the flow of the medium management process that is executed by the server and the player terminal in FIG. 2, having the functional configurations in FIG. 3.

The functional blocks of the player terminal 2 and the server 1 have been described above. Next, the operation in the medium management process that is executed by the player terminal 2 and the server 1 will be described with reference to FIG. 4. Here, FIG. 4 is a sequence diagram for explaining the flow of the medium management process.

The medium management process is executed, for example, in the case where the player has performed a game start operation. Although not specifically mentioned in the following description of the medium management process, it is presupposed for the medium management process that the individual functional blocks of the player terminal 2 and the individual functional blocks of the server 1 executes, as needed and as appropriate, computational processing and communication necessary for executing the medium management process and running the game.

In step S11, the game-running execution unit 211 accepts a game start operation from the player via the player-operation notification unit 212.

In step S12, the game-running execution unit 211 notifies the server 1 of a request for running the game in accordance with the current game scene, by transmitting the request. The notification also includes a notification as to which scene is the current game scene.

In step S21, the available-object determination unit 113 determines cards that are available to the player on the basis of the current data stored in the storage unit 18.

In step S22, the increase/decrease-processing check unit 114, on the basis of the number of the cards available to the player, determined in step S21, whether or not it is allowed to execute special processing involving an increase or decrease in the number of cards.

In step S23, a display screen is determined on the basis of which scene is the current game scene, included in the notification in step S12.

In step S24, the game-running control unit 111 notifies the player terminal 2 of the available cards determined in step S21, whether or not it is allowed to execute special processing involving an increase or decrease in the number of cards, determined in step S22, and the display screen determined in step S23, by transmitting these items of information.

In step S13, the game-running execution unit 211 runs the game on the basis of the content included in the notification in step S24.

In step S14, the game-running execution unit 211 checks whether or not an operation involving a game scene transition has been accepted from the player via the player-operation notification unit 212. For example, the game-running execution unit 211 checks whether or not an operation for changing the game display screen or an operation involving an increase or decrease in the number of cards (e.g., an operation for executing ordinary processing involving an increase or decrease in the number of cards, such as purchasing a card pack, or an operation for executing special processing described earlier, such as card decomposition) has been accepted.

In the case where such an operation involving a game scene transition has been accepted, the check in step S14 results in Yes, and the process returns to step S12. Then, the process described above is executed again in accordance with a new scene. Meanwhile, in the case where such an operation involving a game scene transition has not been accepted, the check in step S14 results in No, and the process proceeds to step S15.

In step S15, the game-running execution unit 211 checks whether or not a deck creating operation including a card selecting operation has been accepted from the player via the player-operation notification unit 212. In the case where a deck creating operation has been accepted, the check in step S15 results in Yes, and the process proceeds to step S16. Meanwhile, in the case where a deck creating operation has not been accepted, the check in step S15 results in No, and the process proceeds to step S17.

In step S16, the game-running execution unit 211 notifies the server 1 of the card selection by the player, accepted in step S15, by transmitting the card selection.

In step S25, the medium-set generation unit 116 creates a deck on the basis of the card selection accepted in step S16, and stores the deck in the management-information storage unit 184.

In step S17, the game-running execution unit 211 checks whether or not a deck using operation (e.g., an operation for starting a battle in which a deck is used) including a deck selecting operation has been accepted from the player via the player-operation notification unit 212. In the case where a deck using operation has been accepted, the check in step S17 results in Yes, and the process proceeds to step S18. Meanwhile, in the case where a deck using operation has not been accepted, the check in step S17 results in No, and the process proceeds to step S19.

In step S18, the game-running execution unit 211 notifies the server 1 of the deck selection by the player, accepted in step S17, by transmitting the deck selection.

In step S26, the medium-set generation unit 116 checks whether or not the number of cards included in the deck according to the notification in step S18 is insufficient due to the expiration of the usage periods of universal fixed-term cards or conditional fixed-term cards and the resulting decrease in the number of available cards.

In step S27, the game-running control unit 111 notifies the player terminal 2 of whether or not the deck is usable on the basis of the result of the check in step S27 by transmitting this information. The game-running execution unit 211 continues to run the game on the basis of whether or not the deck is usable according to the notification.

In step S19, the game-running execution unit 211 checks whether or not a game termination operation has been accepted from the player via the player-operation notification unit 212. In the case where a game termination operation has been accepted, the check in step S19 results in Yes, and the process is terminated. Meanwhile, in the case where a game termination operation has not been accepted, the check in step S19 results in No, the process returns to step S13, and the process described above is repeated.

As described above, the medium management process is executed through cooperation between the player terminal 2 and the server 1. With the medium management process, it is possible to more simply manage game media having various properties on a computer, without having to execute laborious processing necessary with ordinary technology, such as managing game media on the basis of unique serial numbers individually assigned to the game media. Furthermore, with the medium management process, while performing such simple management, it is possible to proceed with the game while creating a deck including cards having different properties on the basis of selection by the player.

DISPLAY EXAMPLES

Next, examples of display screens that are displayed with the medium management process on the display connected to the output unit 27 under the control of the game-running execution unit 211 will be described with reference to FIGS. 5 to 9. FIGS. 5 to 9 are schematic illustrations showing the example display screens.

Figure 5:
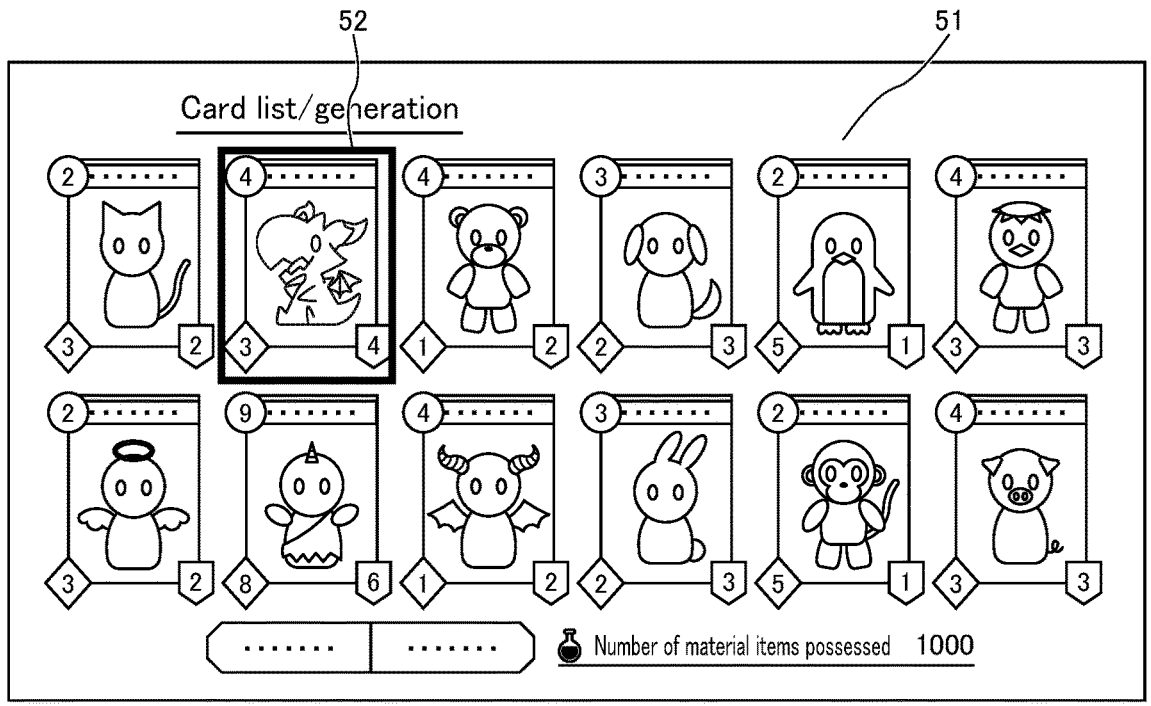
FIG. 5 is a schematic illustration showing an example card list screen that is displayed in the medium management process.

FIG. 5 shows an example card list screen that is displayed in the medium management process. The player performs an operation for transitioning to this screen when confirming the cards available to the player himself or herself in a list. In the display example shown in FIG. 5, cards that are currently available to the player are individually shown at the middle rows in the screen, as shown as an indication 51. Specifically, each card is displayed together with the card name, the graphics of a character corresponding to the card, a numerical value indicating the ability of the card, and a numerical value indicating the rarity of the card. This list screen is directed to clearly representing all the cards available to the player. Thus, each card is displayed in such a manner that it is not possible to distinguish whether the card is a possessed card or a universal fixed-term card/conditional fixed-term card. That is, cards are displayed without making distinction as to card properties.

Suppose that, in this case, the player performs an operation for selecting the card indicated as an indication 52. Then, a transition to a card detail screen representing the details of this card occurs.

Figure 6:
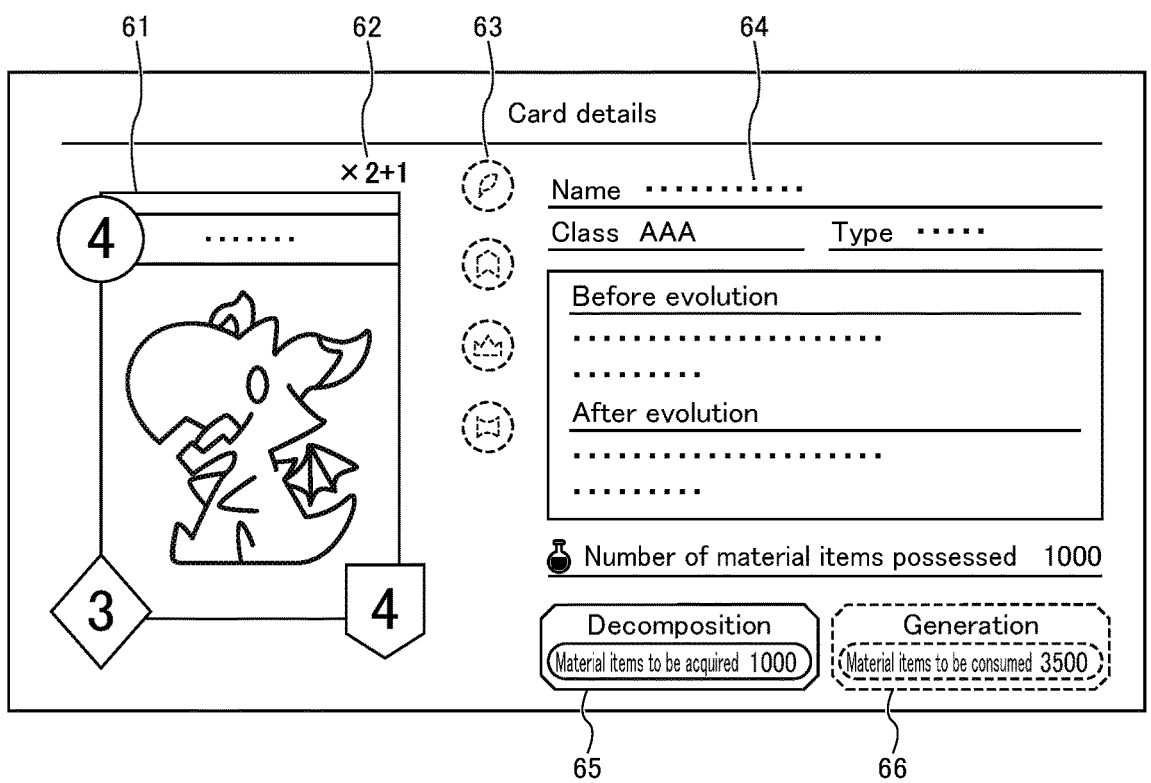
FIG. 6 is a schematic illustration showing an example card detail screen that is displayed in the medium management process.

FIG. 6 shows an example card detail screen. In the example display shown in FIG. 6, the card for which details are displayed is displayed similarly to FIG. 5, as shown as an indication 61.

Furthermore, this detail screen is directed to showing the details of the card selected by the player. Thus, each card is displayed in such a manner that it is possible to distinguish whether the card is a possessed card or a universal fixed-term card/conditional fixed-term card. That is, cards are displayed while making distinction as to card properties. Specifically, values indicating how many possessed cards of this kind and how many universal fixed-term cards/conditional fixed-term cards of this kind are present are displayed, as shown as an indication 62. In this example, the indication "×2" indicates that two possessed cards of this kind are present. Furthermore, the indication "+1" indicates that one universal fixed-term card/conditional fixed-term card is present. In order to facilitate distinction between these individual indications "×2" and "+1", the colors or the like of the characters of the individual indications may be varied.

Furthermore, operation icons for executing various kinds of processing with this card are displayed, as shown as an indication 63. In this example, since a possessed card of this kind is present, it is possible to premiumize this card. Thus, for example, an icon for premiumizing this card is displayed as an operation icon.

Furthermore, text indicating the properties, etc. of this card is displayed, as shown as an indication 64. Furthermore, in this example, since a possessed card of this kind is present, it is possible to decompose this card. Thus, an operation button for decomposing this card is displayed as an operation button, together with the number of material items that can be acquired by decomposition, as shown as an indication 65. Meanwhile, in this example, two possessed cards of this kind and one universal fixed-term card/conditional fixed-term card of this kind are present, the total number of cards of this kind is three. Thus, it is not possible to generate a card of this kind. Thus, although an operation button for generating a card of this kind is displayed as an operation button together with the number of material items that are consumed for the generation, the operation button is displayed in a state in which an operation is not accepted, as shown as an indication 66. For example, the operation button is displayed in a state of color similar to the background color so as to indicate the state in which an operation is not accepted. In the figure, this state is represented by using broken lines.

Figure 7:
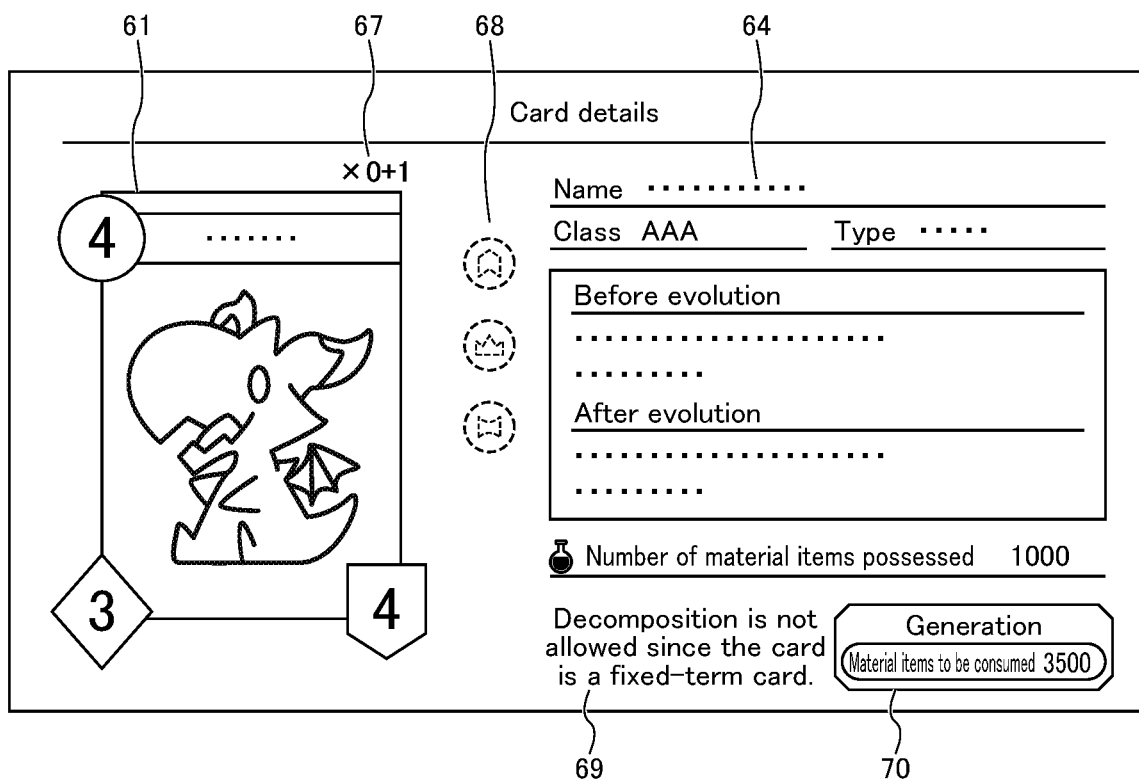
FIG. 7 is a schematic illustration showing another example card detail screen that is displayed in the medium management process.

FIG. 7 shows another example card detail screen. Since the display example shown in FIG. 7 is basically the same as the display example shown in FIG. 6, only differences will be described with different reference signs attached thereto. As opposed to the indication 62 in FIG. 6, in this example, the indication "×0" indicates that no possessed card of this kind is present, as shown as an indication 67. Furthermore, the indication "+1" indicates that one universal fixed-term card/conditional fixed-term card of this kind is present.

In this example, since no possessed card of this kind is present, it is not possible to premiumize or decompose a card of this kind. Thus, as opposed to the indication 63 in FIG. 6, some icons including an icon for premiumizing a card of this kind are not displayed, as shown as an indication 68. Furthermore, as opposed to the indication 65 in FIG. 6, text indicating that decomposition is not allowed, such as "decomposition is not allowed since the card is a fixed-term card", is displayed, as shown as an indication 69. Meanwhile, in this example, since no possessed card of this kind is present and one universal fixed-term card/conditional fixed-term card of this kind is present, the total number of cards of this kind is one. Thus, it is possible to generate a card of this kind. Accordingly, as opposed to the indication 66 in FIG. 6, an operation button for generating a card of this kind is displayed as an operation button in an operable state, together with the number of material items that are consumed for the generation, as shown as an indication 70.

As described above, through the individual processing steps in the medium management process described above, available cards and whether or not increase/decrease processing is allowed are clearly displayed to the player. Furthermore, depending on the purpose of the display screen, switching is performed, in accordance with the game scene, between manners of display so that the player can distinguish or cannot distinguish whether each card available to the player is a possessed card, a universal fixed-term card, or a conditional fixed-term card.

Figure 8:
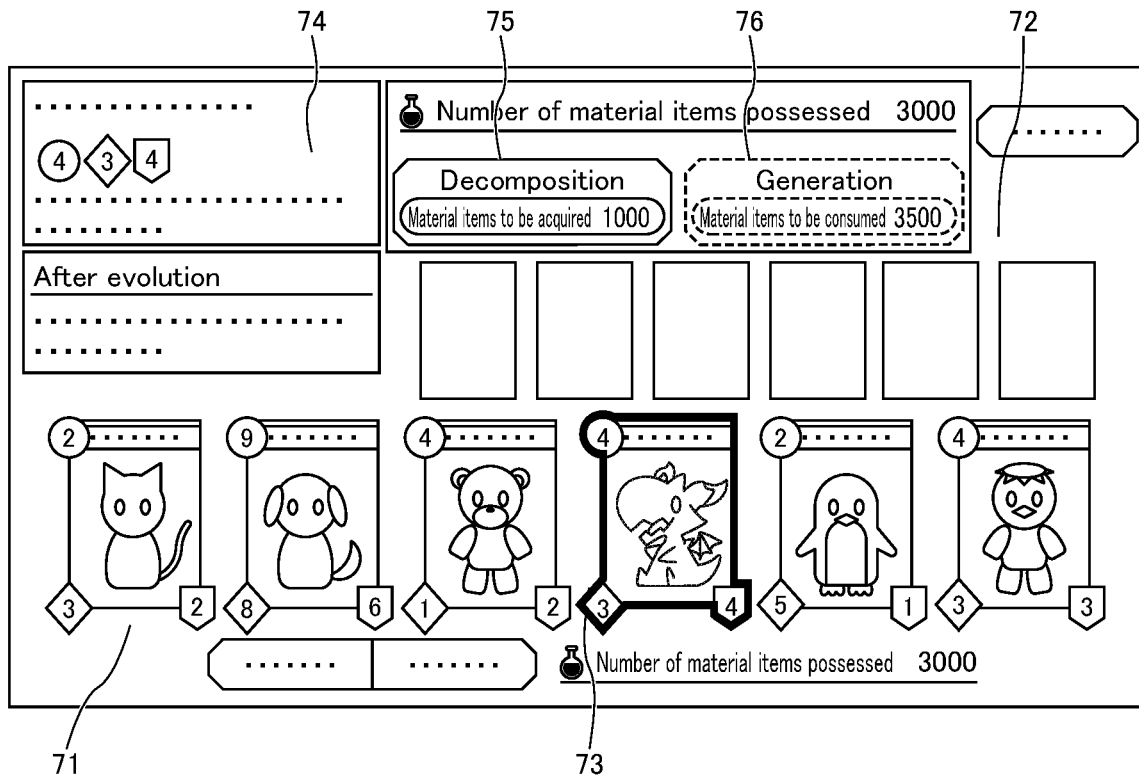
FIG. 8 is a schematic illustration showing an example deck creation screen that is displayed in the medium management process.

FIG. 8 shows an example deck creation screen as another example display. The player performs an operation for transitioning to this screen when performing a deck creating operation for creating a deck, including a card selecting operation. Similarly to the indication 51 in FIG. 5, cards that are currently available to the player are individually displayed, as shown as an indication 71. As the card selecting operation, the player can include one of the available cards in a deck by selecting that card and moving the card into an area shown as an indication 72 at the middle row in the screen. Furthermore, the player can finish a deck creating operation by including a prescribed number of cards (forty cards here) in the deck through such selecting operations.

Suppose that, in this case, the player performs an operation for selecting a card shown as an indication 73. Then, text indicating the properties, etc. of the card is displayed, as shown as an indication 74.

Furthermore, this deck generation screen is directed to clearly showing all the cards available to the player. Thus, each card is displayed in such a manner that it is not possible to distinguish whether the card is a possessed card or a universal fixed-term card/conditional fixed-term card. That is, cards are displayed without making distinction as to card properties. However, similarly to indications 65 and 66 in FIG. 6 or indications 69 and 70 in FIG. 7, operation buttons for card decomposition and card generation, shown as indications 75 and 76, are displayed on the basis of the numbers of possessed cards and universal fixed-term cards/conditional fixed-term cards that are present. That is, whether increase/decrease processing is allowed is clearly displayed to the player.

Figure 9:
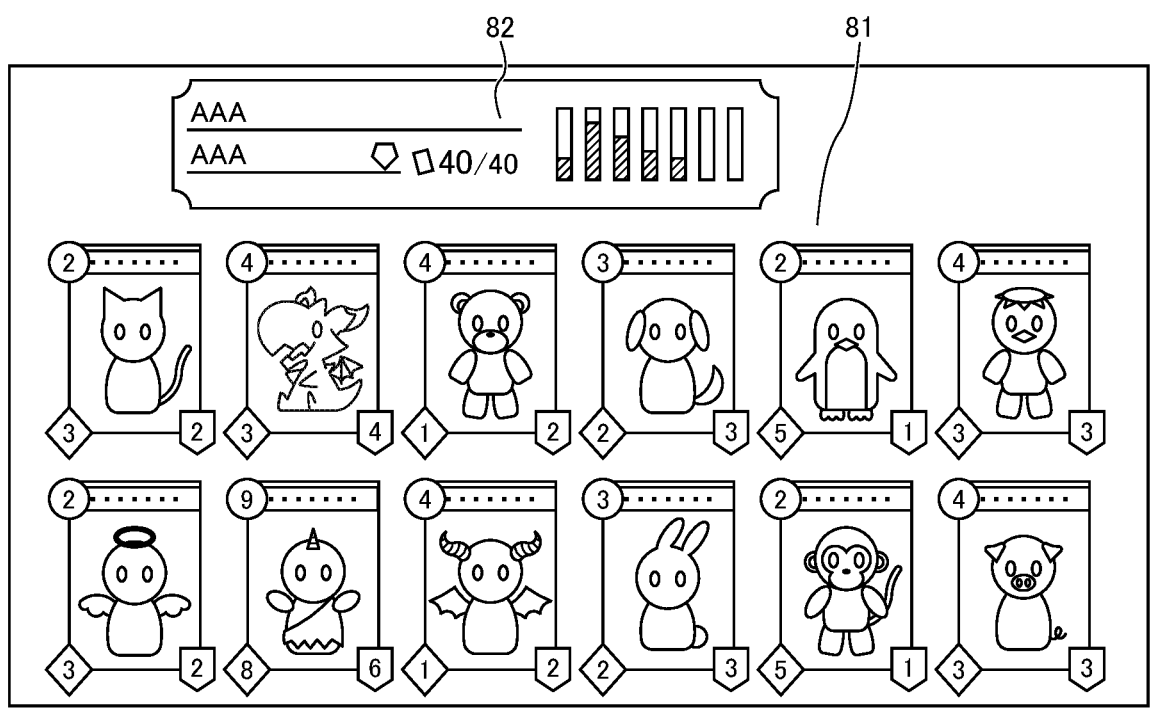
FIG. 9 is a schematic illustration showing an example deck confirmation screen that is displayed in the medium management process.

FIG. 9 shows an example deck confirmation screen as another example display. The player performs an operation for transitioning to this screen when confirming the cards that are included in a created deck. Similarly to the indication 51 in FIG. 5, cards included in a deck are individually displayed, as shown as an indication 81. Furthermore, the deck name and a bar graph indicating the deck composition are displayed in an area displayed at the top row in the screen, as shown as an indication 82.

This deck confirmation screen is directed to clearly showing all the cards included in a deck. Furthermore, as described above, the cards included in a deck are managed irrespective of the properties thereof. Thus, each card is displayed in such a manner that it is not possible to distinguish whether the card is a possessed card or a universal fixed-term card/conditional fixed-term card. That is, cards are displayed without making distinction as to card properties.

As in the display examples described above, in this embodiment, through the individual processing steps in the medium management process described above, information necessary for the purpose of display screens corresponding to game scenes can be displayed clearly to the player.

[Modifications]

Although the embodiment of the present invention has been described above, the embodiment is merely an example and does not limit the technical scope of the present invention. The present invention can be embodied in various other forms, and it is possible to make various modifications, such as omission and substitution, without departing from the spirit of the present invention. These embodiments and modifications thereof are encompassed in the scope and spirit of the invention disclosed in this description, etc. and are encompassed in the scope of the invention recited in the claims and equivalents thereof.

<First Modification>

Figure 10:
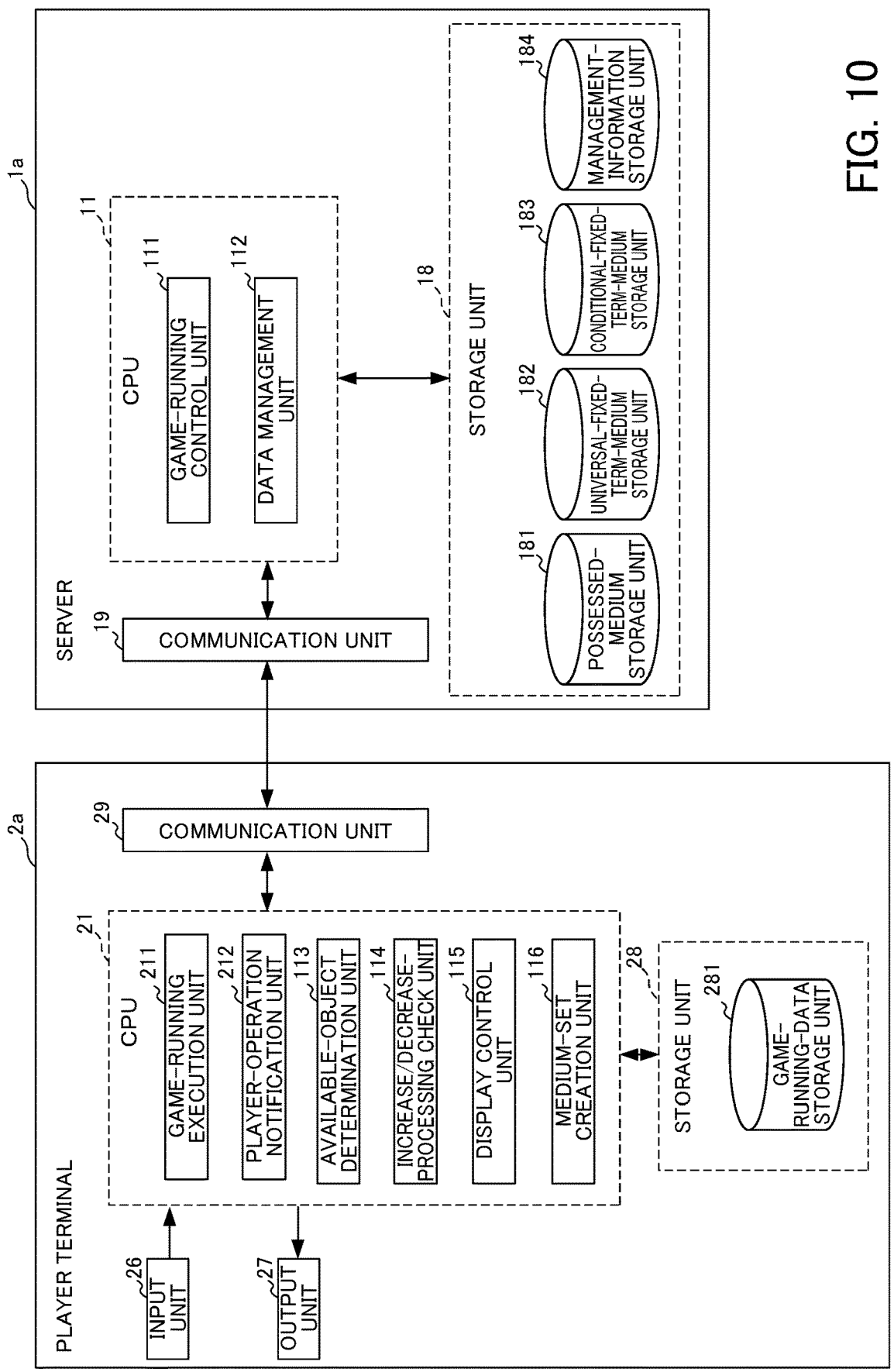
FIG. 10 is a functional block diagram showing functional configurations for executing the medium management process in a first modification in the functional configurations of the server and the player terminal in FIG. 2.

As a first modification, some of the functional blocks of the server 1 may be realized by the player terminal 2. For example, some or all of the available-object determination unit 113, the increase/decrease-processing check unit 114, the display control unit 115, and the medium-set generation unit 116 may be realized by the player terminal 2. The functional configurations in the case of this modification will be described with reference to FIG. 10. FIG. 10 is a functional block diagram showing, in the functional configuration of the server 1 and the functional configuration of the player terminal 2, functional configurations for executing the medium management process in this modification. For the purpose of distinction from the server 1 and the player terminal 2 in the embodiment described above, this modification will be described while additionally attaching the reference sign "a" to the server 1 and referring to the server as a server 1a. Similarly, this modification will be described while additionally attaching the reference sign "a" to the player terminal 2 and referring to the player terminal as a player terminal 2a.

As shown in FIG. 10, in the case where the medium management process in this modification is executed, the CPU 21 of the player terminal 2a functions as the available-object determination unit 113, the increase/decrease-processing check unit 114, the display control unit 115, and the medium-set generation unit 116 in addition to the game-running execution unit 211 and the player-operation notification unit 212. Meanwhile, in the case where the medium management process in this modification is executed, the CPU 11 of the server 1a does not function as the available-object determination unit 113, the increase/decrease-processing check unit 114, the display control unit 115, or the medium-set generation unit 116.

With these functional configurations, the server 1a manages the individual items of data stored in the storage unit 18 in particular through cooperation between the game-running control unit 111 and the data management unit 112.

Furthermore, the game-running control unit 111 of the server 1a extracts the individual items of data stored in the storage unit 18, for example, in the case where a query for cards available to the player is received from the available-object determination unit 113 of the player terminal 2a. That is, the game-running control unit 111 extracts the card IDs and the number of possessed cards associated with the player ID of the player for which the query has been received. Furthermore, the game-running control unit 111 extracts, from the universal-fixed-term-medium storage unit 182, the card IDs and the number of universal fixed-term cards for which the usage periods have not yet expired. Furthermore, the game-running control unit 111 extracts, from the conditional-fixed-term-medium storage unit 183, the card IDs and the number of conditional fixed-term cards that are associated with the obtained player ID and for which the usage periods have not yet expired.

Furthermore, the game-running control unit 111 notifies the player terminal 2a of these items of extracted data by transmitting the data. Upon receiving the notification, the available-object determination unit 113 of the player terminal 2a determines cards that are available to the player, similarly to the available-object determination unit 113 in the embodiment described above.

Furthermore, upon receiving the notification, the increase/decrease-processing check unit 114, the display control unit 115, and the medium-set generation unit 116 of the player terminal 2a individually execute processing similarly to the increase/decrease-processing check unit 114, the display control unit 115, and the medium-set generation unit 116 in the embodiment described above. Also with this modification, it is possible to realize a process that is equivalent to the medium management process described above.

<Second Modification>

Furthermore, as a second modification, all of the functional blocks of the server 1 and the functional blocks of the player terminal 2 may be realized by a single device. That is, all the functional blocks in the embodiment described above may be realized by a single device. Also with this modification, it is possible to realize a process that is equivalent to the medium management process described above.

<Third Modification>

In the embodiment described above, fixed-term cards including universal fixed-term cards and conditional fixed-term cards are managed in addition to possessed cards. Here, without limitation to these fixed-term cards, which are cards that can be used by the player only within the usage periods thereof, cards having other properties may be managed. For example, instead of the usage periods, which are period-based conditions, cards whose availability is determined on the basis of other conditions may be managed. Here, examples of the other conditions include a condition that the availability is effective for a prescribed number of times of usage in battles, a condition that the availability is effective until the player wins a prescribed number of times (or loses a prescribed number of times) in battles, and a condition that the availability is effective when the level of the player is not lower than a prescribed level (or is lower than a prescribed level).

In the case where cards whose availability is determined on the basis of these other conditions are managed, the "other conditions" are stored instead of "period information" in the universal-fixed-term-medium storage unit 182 and the conditional-fixed-term-medium storage unit 183. Furthermore, the available-object determination unit 113 determines cards that are available to the player in the game on the basis of whether or not the "other conditions" stored in the universal-fixed-term-medium storage unit 182 and the conditional-fixed-term-medium storage unit 183 are satisfied instead of whether or not the usage periods of cards have expired. Furthermore, the increase/decrease-processing check unit 114 handles the cards whose availability is determined on the basis of the other conditions similarly to fixed-term cards in increase/decrease processing, such as card generation, card decomposition, and card premiumization.

Also in this case, it is possible to realize management similar to that in the case of managing fixed-term cards, which makes it possible to more simply manage game media having various properties on a computer.

Note that cards whose availability is determined on the basis of other conditions may be managed in addition to fixed-term cards or cards whose availability is determined on the basis of other conditions may be managed instead of fixed-term cards.

<Other Modifications>

For example, although the server 1 and the player terminal 2 to which the present invention is applied have been described by using a server device, a game machine, and a smartphone as examples in the context of the above-described embodiment, there is no particular limitation to these examples. The present invention is generally applicable to electronic appliances having information processing functions. Furthermore, the functional configurations of the server 1 and the player terminal 2 may be realized with a single device. Alternatively, the functions of the server 1 may be realized with a plurality of devices by distributing the functions to a plurality of server devices such as cloud servers.

In other words, the functional configurations shown in FIG. 3 are merely examples, and there is no particular limitation thereto. That is, it suffices to provide the server 1 and the player terminal 2 with functions that make it possible to execute the series of processing steps described above as a whole, and the choice of specific functional blocks for realizing those functions is not particularly limited to that in the examples in FIG. 3.

Furthermore, the functional configurations described above can be executed by hardware, by software, or by a combination of hardware and software. For example, the functional configurations in the embodiment are realized by using processors that execute computational processing. Processors that can be used in the embodiment include a processor constituted of only one information processing device of various kinds, such as a single processor, a multiprocessor, or a multicore processor, as well as a combination of one of these various kinds of processing devices and a processing circuit such as an application specific integrated circuit (ASIC) or a field-programmable gate array (FPGA).

In the case where the functional configurations are executed at least partially by software, a program constituting the software is installed in a computer or the like from a network or a recording medium.

The computer may be a computer embedded in special hardware. Alternatively, the computer may be a computer that is capable of executing various functions when various programs are installed therein, such as a general-purpose personal computer.

A recording medium including such a program is implemented by the removable medium 100 in FIG. 2, which is distributed separately from the main unit of a device in order to provide a player with the program, or is implemented by a recording medium or the like that is provided to a player in a state embedded in advance in the main unit of a device. The removable medium 100 is implemented, for example, by a magnetic disk (including a floppy disk), an optical disk, or a magneto-optical disk. The optical disk is implemented, for example, by a compact disk-read only memory (CD-ROM), a digital versatile disk (DVD), or a Blu-ray (registered trademark) disc. The magneto-optical disk is implemented, for example, by a mini-disk (MD). Furthermore, the recording medium that is provided to a player in a state embedded in advance in the main unit of a device is implemented, for example, by the ROM 12 in FIG. 2 or the ROM 22 in FIG. 2, in which the program is recorded, or a semiconductor memory included in the storage unit 18 in FIG. 2 or the storage unit 28 in FIG. 2.

Note that, in this description, steps defining the program recorded in the recording medium may include processing that is not necessarily executed sequentially but is executed in parallel or individually, as well as processing that is executed sequentially in order. Furthermore, steps that are executed according to the program recorded in the recording medium may be executed in an arbitrary order within a scope not departing from the spirit of the present invention.

EXPLANATION OF REFERENCE NUMERALS 1, 1a Server
2, 2a Player terminal
5 Network
11, 21 CPU
12, 22 ROM
13, 23 RAM
14, 24 Bus
15, 25 Input/output interface
16, 26 Input unit
17, 27 Output unit
18, 28 Storage unit
19, 29 Communication unit
20, 30 Drive
100 Removable medium
111 Game-running control unit
112 Data management unit
113 Available-object determination unit
114 Increase/decrease-processing check unit
115 Display control unit
116 Medium-set creation unit
181 Possessed-medium storage unit
182 Universal-fixed-term-medium storage unit
183 Conditional-fixed-term-medium storage unit
184 Management-information storage unit
211 Game-running execution unit
212 Player-operation notification unit
281 Game-running-data storage unit
S Information processing system

The invention claimed is:

1. A non-transitory computer readable medium storing an information processing program for causing a computer to perform a method comprising:
  managing first management information and second management information as information for managing a plurality of game media having assigned thereto a plurality of common medium identifiers that are common for each game medium of the plurality of game media having of the same kind,
  wherein the first management information indicates a first plurality of medium identifiers and a number of game media possessed by a player, and
  wherein the second management information indicates a second plurality of medium identifiers and a plurality of usage periods for game media;
  determining a plurality of available game media available to the player based on the first management information and the second management information;

creating a medium set that includes a plurality of selected game media based on an operation performed by the player to select from the plurality of available game media;

managing, after creating the medium set, the medium set based on a number of the plurality of available game media available to the player and without regard to whether the plurality of selected game media are possessed by the player or the plurality of selected game media have at least one usage period;

deleting a first game medium from the medium set and in response to:
  determining that a usage period of the first game medium expires,
  determining that the first game medium is included in the medium set,
  determining that the number of game media possessed by the player has increased by a second game medium, and
  determining that the second game medium is the same kind as the first game medium; and
adding the second game medium to the medium set in response to deleting the first game medium.

2. A non-transitory computer readable medium storing an information processing program according to claim 1, wherein the method further comprises managing, as the second management information, both information indicating a second plurality of medium identifiers and a second plurality of usage periods of game media available to all players among a plurality of players as well as information indicating a portion of the second plurality of medium identifiers and a portion of the second plurality of usage periods of game media available to some players among the plurality of players.

3. A non-transitory computer readable medium storing an information processing program according to claim 1, wherein the method further comprises:
  determining, based on a number of the plurality of game media available to the player, and
  determining whether execute increase processing involving the plurality of game media.

4. A non-transitory computer readable medium storing an information processing program according to claim 1, wherein the method further comprises:
  determining, based on the number of the game media available to the player, whether to execute decrease processing involving the plurality of game media.

5. A non-transitory computer readable medium storing an information processing program according to claim 1, wherein in response to creating the medium set, the medium set includes the plurality of game media possessed by the player preferentially than the plurality of game media having the usage periods set therefor.

6. A non-transitory computer readable medium storing an information processing program according to claim 1, wherein the method further comprises:
  executing control to perform switching between a plurality of manners of display so that the player can distinguish whether a game medium available to the player is a game medium possessed by the player or a game medium having the usage period set therefor, in accordance with a scene in a game that is played by using the plurality of game media.

7. An information processing device comprising:
a processor; and
a memory connected to the processor, wherein the memory comprises a program configured to perform a method comprising:
managing first management information and second management information as information for managing a plurality of game media having assigned thereto a plurality of common medium identifiers that are common for each medium of the same kind,
  wherein the first management information indicates a first plurality of medium identifiers and a number of game media possessed by a player, and
  wherein the second management information indicates a second plurality of medium identifiers and a plurality of usage periods for game media;
determining a plurality of available game media available to the player based on the first management information and the second management information;
creating a medium set that includes a plurality of selected game media based on an operation performed by the player to select from the plurality of available game media;
managing, after creating the medium set, the medium set based on a number of the plurality of available game media available to the player and without regard to whether the plurality of selected game media are possessed by the player or the plurality of selected game media have at least one usage period;
deleting a first game medium from the medium set and in response to:
  determining that a usage period of the first game medium expires,
  determining that the first game medium is included in the medium set,
  determining that the number of game media possessed by the player has increased by a second game medium, and
  determining that the second game medium is the same kind as the first game medium; and
adding the second game medium to the medium set in response to deleting the first game medium.

8. An information processing system comprising a server and a terminal communicatively connected to the server,
the server comprising:
a first processor and a first memory connected to the first processor, wherein the first memory comprises a first program configured to perform a first method comprising:
  managing first management information and second management information as information for managing a plurality of game media having assigned thereto a plurality of common medium identifiers that are common for each game medium of the plurality of game media having the same kind,
    wherein the first management information indicates a first plurality of medium identifiers and a number of game media possessed by a player, and
    wherein the second management information indicates a second plurality of medium identifiers and a plurality of usage periods for game media; and
  transmitting the first management information and the second management information to the terminal, and
the terminal comprising:
a second processor and a second memory connected to the second processor, wherein the second memory comprises a second program configured to perform a second method comprising:

receiving the first management information and the second management information;

determining a plurality of available game media available to the player based on the first management information and the second management information; and creating a medium set that includes a plurality of selected game media an operation performed by the player to select from the plurality of available game media;

managing, after creating the medium set, the medium set based on a number of the plurality of available game media available to the player and without regard to whether the plurality of selected game media are possessed by the player or the plurality of selected game media have at least one usage period;

deleting a first game medium from the medium set and in response to:

determining that a usage period of the first game medium expires, determining that the first game medium is included in the medium set, determining that the number of game media possessed by the player has increased by a second game medium, and determining that the second game medium is the same kind as the first game medium; and adding the second game medium to the medium set in response to deleting the first game medium.

* * * * *